United States Patent [19]

Taylor

[11] Patent Number: 4,485,453

[45] Date of Patent: Nov. 27, 1984

[54] DEVICE AND METHOD FOR DETERMINING THE LOCATION AND ORIENTATION OF A DRILLHOLE

[75] Inventor: Russell H. Taylor, Ossining, N.Y.

[73] Assignee: International Business Machines Corporation, Armonk, N.Y.

[21] Appl. No.: 363,211

[22] Filed: Mar. 29, 1982

[51] Int. Cl.³ ............................................... G01B 5/20
[52] U.S. Cl. .................................... 364/571; 364/513; 364/475; 364/474; 364/191; 364/560; 33/180 R; 901/45; 318/568; 408/3; 408/13
[58] Field of Search .................... 408/8, 9, 10, 11, 12, 408/13, 75, 72, 73, 74, 76, 1, 3; 318/568; 364/513, 475, 571, 474, 191, 550, 551, 560; 29/271; 82/45; 33/180 R; 901/45

[56] References Cited

U.S. PATENT DOCUMENTS

| | | | |
|---|---|---|---|
| 2,963,927 | 12/1960 | Hanger | 77/13 |
| 3,232,142 | 2/1966 | Oeckl et al. | 77/32.2 |
| 3,727,119 | 4/1973 | Stanley et al. | 318/568 |
| 3,878,595 | 4/1975 | Boyle | 29/200 P |
| 4,098,556 | 7/1978 | Sugimoto | 408/3 |
| 4,190,889 | 2/1980 | Etoh et al. | 364/474 |
| 4,356,556 | 10/1982 | Sterki | 364/560 |
| 4,428,055 | 1/1984 | Kelley et al. | 364/560 X |

OTHER PUBLICATIONS

D. M. Lambeth, "An Approach to Tactile Feedback Programming for Robotic Drilling," Robot VI Conference, Society of Manufacturing Engineers (MS82-120, Mar. 2-4, 1982).

Primary Examiner—Jerry Smith
Assistant Examiner—Allen MacDonald
Attorney, Agent, or Firm—Carl C. Kling

[57] ABSTRACT

A drillhole centerline determining interposer having a central cavity enables a robot to probe the interposer to learn the location and orientation of the desired drillhole. The interposer is a mushroom shaped device with a planar head and a stem dimensioned to fit snugly in the hole to be drilled. The interposer, in addition to the planar head from which the perpendicular can be calculated through multiple probes, has a central pocket concentric to the interposer stem.

The method of using the drillhole centerline determining interposer is to place a number of such interposers manually in position in holes in a master part located in the work envelope of the robot. The robot operator prepositions the probe at an initial position facing the cavity of the interposer for a drillhole locating sequence for the related drillhole. In sequence, the robot moves the probe from the initial position sufficient to clear the edge of the cavity and by multiple probes determines the plane of the interposer surface platform. The robot then adjusts the yaw and pitch of the probe to orient the probe orthogonal to the platform plane (a vector parallel to the desired drillhole centerline axis). The robot, with orientation vector stored, now locates the XYZ coordinates of the drillhole by cavity probing actions determining the epicenter of the pocket.

With orientation vector (pitch and yaw) known, and with coordinates (XYZ) known, the drillhole is determined.

24 Claims, 7 Drawing Figures

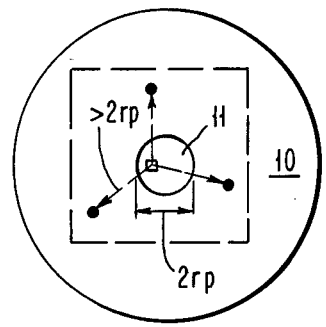
FIG. 4.1
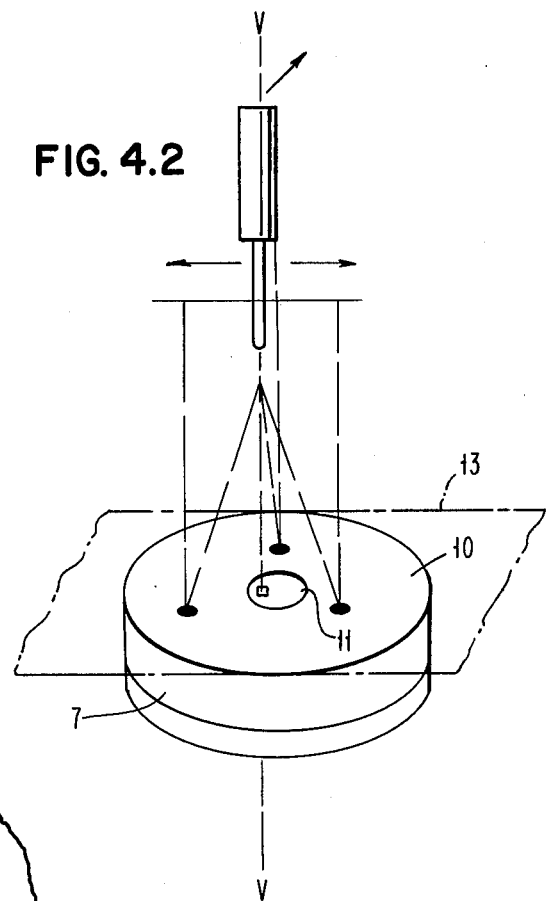
FIG. 4.2
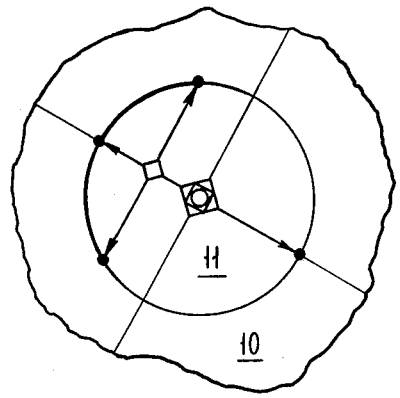
FIG. 4.3
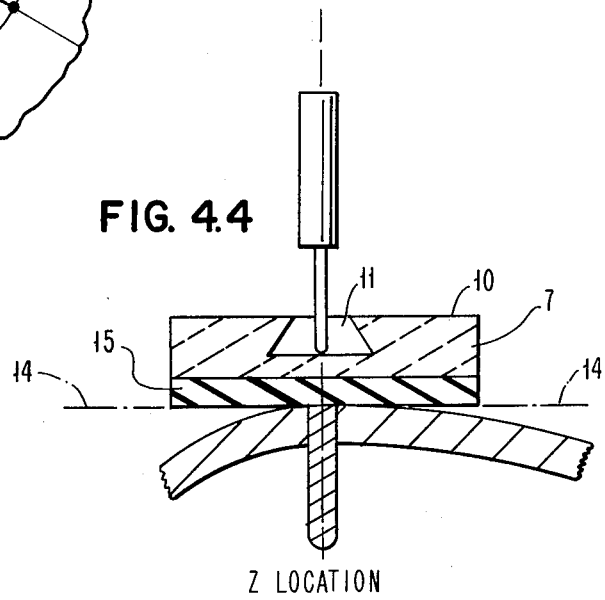
FIG. 4.4

DEVICE AND METHOD FOR DETERMINING THE LOCATION AND ORIENTATION OF A DRILLHOLE

BACKGROUND OF THE INVENTION

The invention pertains to apparatus and methods for teaching a robot the position and orientation of drillhole centerlines, by examination of drillholes in a master part, so that the robot can perform a drill sequence in additional workpieces so as to produce production parts corresponding to the master part.

Techniques for programming a robot to carry out a drill sequence based upon numeric control information are well known, but it is time consuming and somewhat difficult even for a skilled person to develop such control information mathematically, especially when the position and orientation of the holes relative to the master part are not available in computer-readable form. Techniques also have been worked out for teaching a robot a drillhole configuration based upon manual sequencing of probing actions on a master part. During a single pass through the drill sequence under control of the human operator, the robot learns the sequence, and can thereafter duplicate the sequence. The drawback of this procedure is that it requires a skilled operator a significant period of time to go through the proper drill sequence. Under certain circumstances the operator will not be able to view the master part properly or have the dexterity in control required to locate the drillholes properly and particularly may not have the capability to provide the proper pitch and yaw coordinates to match the drillhole in the master part.

Most drillholes are drilled normal to the tangential plane of the hole or its approximation at the point of entry, which may be termed the "scribe crosspoint."

In a typical robot hole drilling application, it is important that the robot orient the drill along the desired centerline of the drillhole and move the drill along the centerline while drilling the hole. Improperly locating the drill bit will cause the hole to be drilled in the wrong place; misorientation of the drill relative to the drillhole centerline will cause the hole to be misdirected; misorientation of the drill bit relative to the surface being drilled might cause the hole to be misshapen. The drill bit must contact the surface of the workpiece at a predetermined scribe crosspoint having determinable X, Y, Z coordinates in relation to the workpiece, and the drill axis must be controlled in pitch and yaw to follow the desired centerline orientation. In most drilling operations, the depth of the drillhole is not critical.

In order to use a robot drilling system, data is necessary to determine the scribe crosspoint surface position and centerline orientation of each hole to be drilled. If this data is unavailable in a design data base, then the data must be derived through some form of teaching. Furthermore, teaching may be necessary, even when design data is available, in order to compensate for positional inaccuracies in the robot itself.

Sophisticated programmable robots are capable of using drillhole coordinates relative to the coordinate system of the workpiece to be drilled. Sensory data and calibration software are then used to locate the workpiece and to compute how to position the robot's joints so as to provide proper juxtaposition of the workpiece and the drill bit. A teaching session for such robot drilling systems involves the following steps:

(1) Set up a master part at the robot drilling station.
(2) Calibrate the master part coordinate system.
(3) Teach the coordinates of each drillhole relative to the master part and store these coordinates for future playback.

The standard method of teaching drillhole coordinates is to operate the robot as a teleoperator, positioning the drill manually at each hole to be drilled. This procedure has a number of disadvantages as follows:

(1) It is tedious and time consuming.
(2) Its accuracy is limited, especially for determining drillhole centerline orientation.
(3) It may be necessary for the person doing the teaching to place his head inside the work envelope of the robot in order to see the precise relation of the drill bit to the drillhole in the master part. This may constitute a safety hazard.

Techniques in the prior art have been developed using special targets to ascertain the coordinates of the desired drillhole axis, by multiple contacts with a multiple probe under computer control, after an initial approximate orientation is made by manual control. D. M. Lambeth, "An Approach to Tactile Feedback Programming for Robotic Drilling," Robot VI Conference, Society of Manufacturing Engineers (MS82-120), Mar. 2-4, 1982.

SUMMARY OF THE INVENTION

The invention provides a drillhole centerline determining interposer having a pocket, and a method using the drillhole centerline determining interposer to provide for relatively quick and efficient teaching of the position and orientation of drillhole centerlines to the robot by probing the interposers without actually contacting the master part. The advantage of the invention is that rough positioning can be made to the central pocket in the interposer, and exact positioning of the probe can be made with respect to the pocket accurately at a greater speed than with previously available methods and without danger of injury to the operator or damage to the master part through contact from the probe.

Another advantage is that the drill bit can be used as the probe, and that the same probing actions can be used both to calibrate the part and to locate and orient the drillholes.

DESCRIPTION OF THE DRAWINGS

FIG. 4 is a composite drawing (FIGS. 4.1, 4.2, 4.3 and 4.4) showing the method of using the drillhole centerline determining interposer in teaching the robot.

DESCRIPTION OF THE PREFERRED EMBODIMENT

The drillhole centerline determining interposer configuration and method according to the invention provide a simple and inexpensive multidimensional locating technique for a teachable robot drilling apparatus.

The technique of this invention combines simple sensors with programmable robot control to improve the teaching of drillhole coordinates, making use of a central cavity in each drillhole centerline determining interposer. The same location technique is usable both to calibrate the coordinates of the part (master part or workpiece) and to locate and orient the drillholes.

Figure 1:
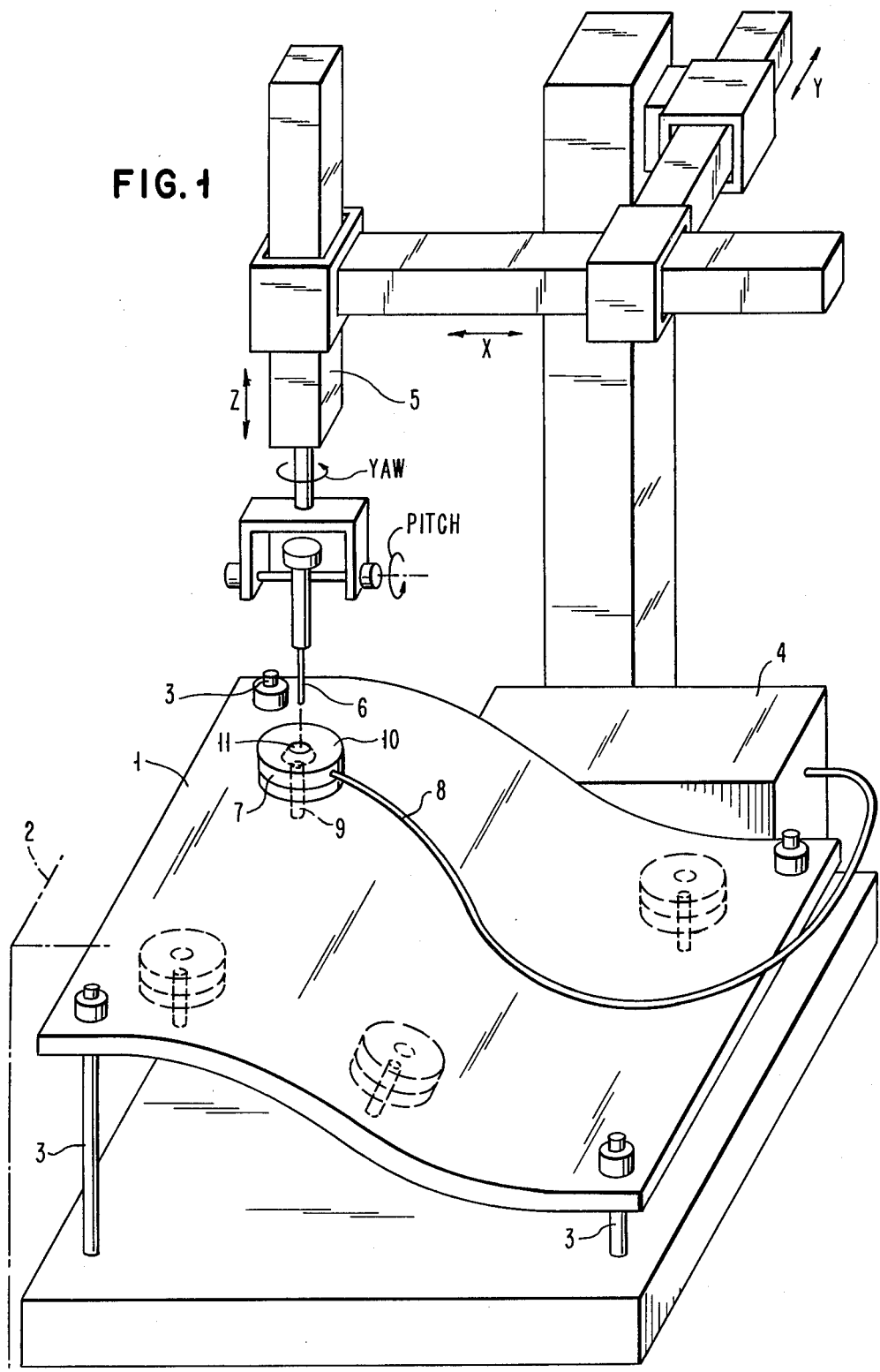
FIG. 1 is a semischematic isometric view of a representative master part, the drillhole centerline determining interposer in place within a drillhole in the master part and the probe at an initial position above the approximate center of the drillhole centerline determining interposer.

FIG. 1 shows a typical apparatus for use in teaching drillhole coordinates for a drilling application. In FIG. 1, master part 1 is located in a work envelope 2 in an orientation which may be fixed as shown in FIG. 1 on support pedestals 3 or may be variable but teachable to the robot. The location technique described in this invention may also be used to locate the part. With master part 1 fixed in place (or determined in space by coordinates known to the robot computer) it is desirable to train the robot. The robot includes a computer 4, positioning mechanism 5 and probe 6. Prior to the teaching operation a drillhole centerline determining interposer 7 according to this invention is placed in each of the several drillholes in the master part 1 for which it is desired to teach the robot the drillhole position and orientation information. Alternatively, a single interposer may be placed into each drill hole, in turn, before that hole is taught. Interposer 7 provides all necessary information to the probe 6 so that probe 6 need never actually contact master part 1. Depending on the requirements of the probe, interposer 7 may provide a fixed object for mechanical probing or, in the case of electrical probing, interposer 7 is provided with suitable electrical connection such as connection 8 to the computer. The interposer is held in place by a suitable mounting means such as mounting pin 9 so as to present a platform 10 which is normal to the drillhole axis, which is also the axis of pocket 11.

Figure 2:
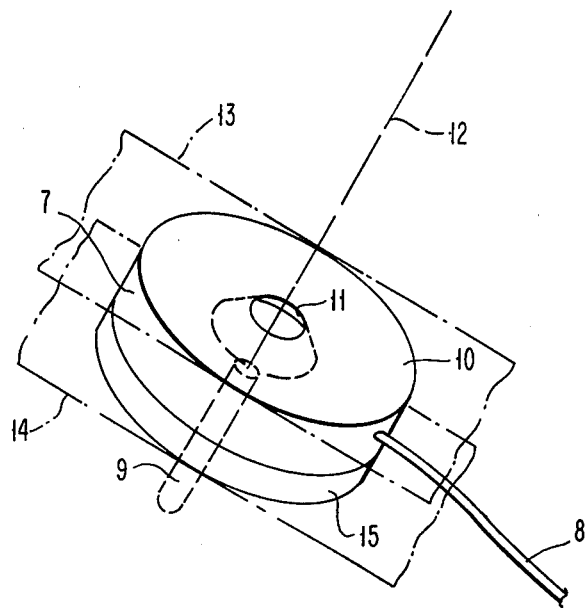
FIG. 2 is an explanatory diagram of the drillhole centerline determining interposer, its platform plane and its contact plane.

FIG. 2 shows the drillhole centerline determining interposer 7 in greater detail. Interposer 7 is generally a mushroom shape with its head forming a planarization platform and with its stem formed by mounting pin 9. Pin 9 is located perpendicular to the top surface of planarization platform 10. Planarization platform 10 has a central cavity 11, with the center of cavity 11 being on the centerline of pin 9 and by inference on the centerline of the drillhole, once pin 9 is inserted snugly into the drillhole of the master part. The drillhole centerline axis (shown by broken line 12) is perpendicular to the surface plane of planarization platform 10 of interposer 7, which platform plane is shown by broken lines 13. A second plane parallel to platform plane 13 is identified by broken line 14. Plane 14 is parallel to platform plane 13 and at a known distance below it so as to rest on the surface of master part 1. Plane 14 may be designated the contact plane. The bottom of the cavity is parallel to platform plane and at a known distance. Coordinates identifying interposer platform plane 13 relative to the master part and coordinates identifying the position of the center of the interposer pocket relative to the master part, thus fully define the (XYZ) location and the (pitch and yaw) orientation of the drillhole. Compliant material 15, while not always necessary for proper operation, helps to hold the interposer in position and helps to protect the master part and the probe from damage. The pin-in-hole contact provides a very good centerline determination where the master drillhole in the master part is deep enough to align precisely the interposer mounting pin 9 with drillhole centerline 12. For thin materials, or shallow holes, contact by the compliant material determines the contact plane. In certain situations, pinless interposers may be used, cemented or held magnetically in place, by mounting means alternative to mounting pin 9.

Figure 3:
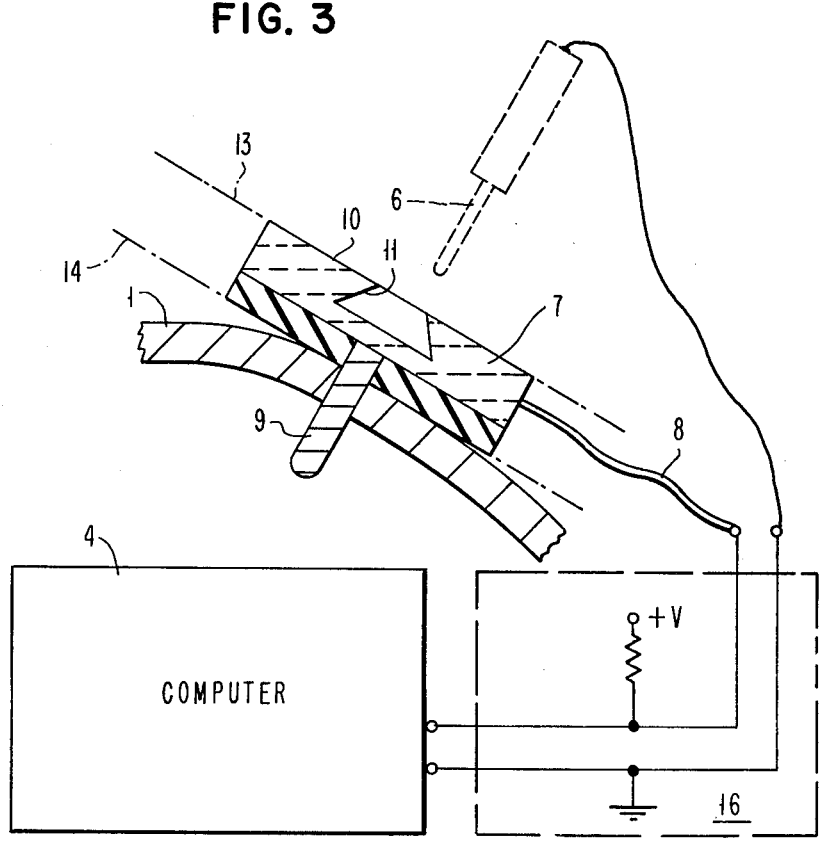
FIG. 3 is an elevation cutaway view of the drillhole centerline determining interposer (in position in the master part) for teaching a robot the position and orientation of desired drillholes.

FIG. 3 shows in semidiagrammatic form a cutaway of interposer 7 in place in a drilled hole in master part 1 and in position for a teaching operation. Robot probe 6 is shown in phantom. Pin 9 is in place, positioned snugly in the hole in the master part, and backed by compliant material 15 so as to define rigorously the position of the desired drillhole. Planarization platform 10 of interposer 7 fully determines platform plane 13. The key is to locate the interposer with the cavity centered over the drillhole centerline and the contact plane perpendicular to the centerline axis. Cavity 11 is a conical section, circular in cross-section so as to present sides undercut as shown in FIG. 3. The conical section is not critical for most operations. The cavity may be cylindrical or tapered, but the inverted conical section is preferred. With the inverted conical section, when probe 6 is inserted and searches sideways, the probe contacts the side of the cavity unambiguously in platform plane 13. Interposer 7, when positioned as shown in FIG. 3, provides a rigorous location of the drillhole centerline and surface scribe crosspoint position. Any surface normal vector to platform plane 13 is parallel to the drillhole centerline axis. The orientation vector thus is parallel to the orientation vector for the drillhole, even though it may be at a finite distance from the XY location of the drillhole centerline axis.

Compliant material 15 is selected from rubber or a similar pad material which exhibits quick recovery time and low hysteresis, so as to minimize the introduction of errors into the drillhole centerline axis calculation.

Voltage input circuit 16 provides computer 4 with contact information.

ALTERNATIVES

The drillhole centerline determining interposer does not demand that any particular form of sensing be used. Contact or proximity sensing may be by any number of alternatives such as strain gauges, ultrasonic probes, electrical continuity, capacitance, etc, which may be generically described as means for sensing proximity, proximity in its wider meaning including both actual touching and near approach. For ease of understanding only, interposer 7 is shown grounded by lead 8, in an electric contact sensing digital input point on the robot controller. The other input is attached to the probe lead of the robot. Contact between probe 6 and the surface 10 of interposer 7 completes the circuit. That is, the robot controller senses contact between probe 6 and platform 10 of interposer 7 and converts this sensing information to positional coordinates.

The interposer may be mounted in place on the master part by adhesive or magnets as mounting means, even though no hole has been drilled in the master part, and still determine the drillhole. In this case, the drillhole orientation is determined by the contact plane 14.

The contact sensing mechanism may be located in the probe or in the interposer (for example, by mounting a piezoelectric strain gauge between the platform surface and the contact surface with electrical leads to the computer) or may involve both the probe and the interposer.

A probe-sensible physical feature other than cavity 11 (for example, a mesa on top of the planarization platform) can replace the cavity, with complementary probing actions, but more care must be taken, and a cavity is preferred. The probe-sensible feature must include an epicenter derivable from probing actions ascertaining its periphery.

METHOD

This invention provides a means by which programmable robots can learn drillhole coordinates and store these coordinates relative to the coordinate system of the workpiece. Sensory data and calibration software are then used to locate the workpiece and to compute how to position the robot's joints so as to position the drill. A teaching session involves the following steps:
1. Set up a master part within the robot work envelope.
2. Calibrate the master part coordinate system.
3. Teach each drillhole.
4. Compute coordinates of each drillhole relative to the master part and store the coordinates for future playback in drilling workpieces to match the master part.

Coordinates and vectors are automatically taken during each probing action and suitable data is preserved to define all probing actions.

FIGS. 4.1–4.4 diagram the method of teaching each drillhole using the drillhole centerline determining interposer and method of this invention.

Step 1. Preparation

A master part is placed in the work envelope of a teachable robot and fitted with one or more drillhole centerline determining interposers. The coordinate system of the master part is determined. The teaching method of this invention may be used to determine the coordinate system of the master part by locating selected holes on the part or on the fixture holding the part.

Step 2. Initial Axis Selection

The coordinate system of the master part having been determined, the operator positions the robot on an initial axis manually or through numeric control. The operator selects an initial axis in which the probe is approximately aligned with the centerline axis of the selected drillhole centerline determining interposer and in which the probe tip is located in or above the pocket of the selected drillhole centerline determining interposer. This establishes an initial probe position at the approximate position and orientation of the desired drillhole centerline.

Step 3. Planarization

Three probing actions grouped around the initial axis determine plane 13. Each such probing action consists of the following substeps:

(a) An approach line is calculated. This approach line is parallel to the initial axis and chosen so that it unambiguously intersects the top surface of planarization platform 10, and not the inside of the cavity. The preferred embodiment selects approach lines 2.5 times the cavity radius from the initial axis, and uses a platform radius equal to 5 times the pocket radius. The specific ratios and geometry should be chosen in accordance with the maximum expected initial misalignment, the geometry of the master part, and the precision of the robot.

(b) Keeping orientation, the probe tip is moved to a point on the approach line that is high enough to be unambiguously clear of planarization platform 10.

(c) Keeping orientation, the probe is moved downward along the approach line until it contacts planarization platform 10.

(d) Keeping orientation, the probe is backed off a short distance and then moved at low speed along the approach line for a second, more accurate contact. Alternatively, the probe may be backed off slowly until contact is broken. This substep may be omitted if the latency between actual contact and response is extremely short.

(e) Substeps a–d are repeated for a sufficient number of probing actions to provide a satisfactory determination of the platform plane of platform 10 of the drillhole centerline determining interposer 7. Three points determine the plane, but additional probing action iterations improve accuracy through use of statistical parameter estimation techniques.

Step 4. Orientation Vector Calculation

The direction of the orientation vector perpendicular to interposer planarization platform 10 is computed from the three or more contact points determined by the probing action substeps of step 3. This vector is parallel to the drillhole centerline axis and passes through the platform plane at the point where the initial axis intersects the platform plane, ensuring entry into the pocket.

Step 5. Reorientation

The probe is reorientated to the orientation vector parallel to the undetermined drillhole centerline axis. If desired, steps 3–5 may be repeated using the new orientation to verify that the correct orientation has been determined.

If this orientatation involves a large change in orientation, steps 2–5 are reiterated. This iterative procedure results in finding three or more new contact points, and the surface determination is repeated. This iterative procedure reduces the likelihood that imperfections in the probe tip will cause erroneous readings. This is especially important if a drill bit is used as the probe.

Step 6. Repositioning

The probe is oriented to the orientation vector and moved along its own axis to a point unambiguously within the pocket 11 of drillhole centerline determining interposer 7.

Step 7. Cavity Probing

The probe then is directed to take probing actions to search for contact points between the sides of the probe and the lip of the cavity. The search pattern includes the following substeps:

(a) Keeping orientation, move in the plane perpendicular to the drillhole centerline axis until the probe contacts the cavity lip.

(b) Keeping orientation, move in the opposite direction until the probe contacts the cavity lip. These two actions (7a and 7b) define a chord of the circle formed by the cavity lip in the platform plane of the surface of planarization platform 10.

(c) Keeping orientation, move the probe along the chord to the midpoint of the chord and repeat the two searches within the same plane and perpendicular to the chord. These actions define a diameter of the circle formed by the lip of the cavity. The midpoint of this diameter is on the drillhole centerline axis.

(d) Iterate a, b, c for better precision.

Step 8. Bottom Finding

Keeping orientation, move the probe along the drillhole centerline axis downward, searching along the drillhole centerline axis until the probe contacts the bottom of the cavity. This point lies on the drillhole centerline at a known distance above the surface of the master part. Alternatively, the drillhole surface scribe crosspoint coordinates may be calculated from the drillhole centerline axis determined in steps 1-7 and the contact plane located in steps 3-4. Calculations derived from these probing actions rigorously define the XYZ location (surface scribe crosspoint) at which the drill bit is to contact the workpiece and also rigorously define the pitch and yaw coordinates required to duplicate the orientation.

Having thus described my invention, what I claim as new, and desire to secure by Letters Patent is:

1. A drillhole centerline determining interposer, for use in robot probe locating and orienting of drillhole axes with respect to the coordinates of a master part, comprising:
    (a) a planarization platform having a continuous platform surface defining a platform plane, with a central physical feature with a characteristic shape having an included point derivable from the characteristic shape; and
    (b) mounting means to affix said planarization platform to the master part with said planarization platform surface orthogonal to a desired drillhole axis and with the included point lying on the drillhole axis.

2. The drillhole centerline determining interposer according to claim 1, in which the physical feature is a cavity.

3. The drillhole centerline determining interposer according to claim 1 in which said mounting means is a pin affixed normal to said planarization platform, in which the central physical feature is circular in sections parallel to the platform surface with all section centers on the drillhole axis and the axis of the pin on the drillhole axis.

4. The drillhole centerline determining interposer according to claim 3, further comprising compliant means on the contact surface opposite said planarization platform.

5. The drillhole centerline determining interposer to claim 3, in which the central physical feature is a conical cavity.

6. The drillhole centerline determining interposer according to claim 5, in which said conical cavity is larger below the platform surface than at the platform surface.

7. The drillhole centerline determining interposer according to claim 1, further comprising means for sensing proximity of interposer and probe.

8. The drillhole centerline determining interposer according to claim 7, in which said proximity sensing means is contained in the interposer.

9. The drillhole centerline determining interposer according to claim 8, in which said proximity sensing means comprises force sensors in the interposer.

10. The drillhole centerline determining interposer according to claim 1, further comprising means for sensing contact between interposer and probe.

11. The drillhole centerline determining interposer according to claim 10, in which said contact sensing means is electrical contact sensing.

12. The drillhole centerline determining interposer according to claim 10, in which said contact sensing means is contained in the probe.

13. The drillhole centerline determining interposer according to claim 12, in which said contact sensing means comprises force sensors in the probe.

14. The method of teaching a probe-trainable drill robot coordinates corresponding to a part, comprising the following steps:
    positioning in the work envelope of a drill robot a master part with one or more centerline determining interposers, affixed by mounting means, each interposer having a planarization platform having a planarization surface orthogonal to the related drillhole centerline, and having a central physical feature coaxial with the axis of the drillhole;
    prepositioning the robot probe in an initial position above the central physical feature of a drillhole centerline determining interposer;
    determining the plane of the surface of said drillhole centerline determining interposer;
    positioning the probe to an orientation vector orthogonal to the plane of said drillhole centerline determining interposer, said vector being parallel to the as yet undetermined desired drillhole centerline;
    moving the probe to a point related to said central physical feature;
    examining said central physical feature to find the epicenter;
    calculating drill coordinates for the drillhole centerline parallel to the orientation vector passing through the epicenter.

15. The method of claim 14, further comprising the additional step of moving the probe along the drillhole centerline axis until the point of the probe contacts the central physical feature surface of the drillhole centerline determining interposer and calculating the scribe crosspoint on the surface of the master part, whereby both drillhole centerline and scribe crosspoint on the surface of the master part are determined.

16. The method of teaching a probe-trainable drill robot coordinates corresponding to a part, comprising the following steps:
    positioning in the work envelope of a drill robot a master part with one or more centerline determining interposers, affixed by mounting means, each interposer having a planarization platform having a planarization surface orthogonal to the related drillhole centerline,
    and having a central physical feature coaxial with the axis of the drillhole;
    prepositioning the robot probe in an initial position above the central physical feature of a drillhole centerline determining interposer;
    determining the plane of the surface of said drillhole centerline determining interposer;
    positioning the probe to an orientation vector orthogonal to the plane of said drillhole centerline determining interposer, said vector being parallel to the as yet undetermined desired drillhole centerline;
    moving the probe to a point related to said central physical feature;
    examining said central physical feature to find the epicenter;
    calculating drill coordinates for the drillhole centerline parallel to the orientation vector passing through the epicenter;

in which the central physical feature is a cavity having a rim, and examining the cavity to find the cavity epicenter comprises probing the rim of the cavity to determine the cavity configuration, and calculating from the cavity configuration its epicenter.

17. The method of teaching a probe-trainable drill robot coordinates corresponding to a part, according to claim 16, comprising multiple iterations of probing actions to increase accuracy.

18. The method of teaching a probe-trainable drill robot coordinates corresponding to a part, according to claim 17, in which the probe is a drill bit.

19. The method of teaching a probe-trainable drill robot coordinates corresponding to a part, according to claim 16, in which the probe is a drill bit.

20. The method of teaching a probe-trainable drill robot coordinates corresponding to a part, comprising the following steps:
 positioning in the work envelope of a drill robot a master part with one or more centerline determining interposers, affixed by mounting means, each interposer having a planarization platform having a planarization surface orthogonal to the related drillhole centerline, and having a central physical feature coaxial with the axis of the drillhole;
 prepositioning the robot probe in an initial position above the central physical feature of a drillhole centerline determining interposer;
 determining the plane of the surface of said drillhole centerline determining interposer;
 positioning the probe to an orientation vector orthogonal to the plane of said drillhole centerline determining interposer, said vestor being parallel to the as yet undetermined desired drillhole centerline;
 moving the probe to a point related to said central physical feature;
 examining said central physical feature to find the epicenter;
 calculating drill coordinates for the drillhole centerline parallel to the orientation vector passing through the epicenter;
 in which the central physical feature is a cavity having a rim, and examining the cavity to find the cavity epicenter comprises probing the rim of the cavity to determine the cavity configuration, and calculating from the cavity configuration its epicenter;
 in which the cavity cross-section is circular and examining the cavity comprises:
 moving said probe sideways along a chord selected by the computer until the probe contacts the lip of the cavity;
 returning the probe along the chord until the probe locates the opposite lip of the cavity at the other end of the chord;
 returning the probe to the midpoint of the chord whose midpoint lies on a diameter of the circle formed by the lip of said cavity, said diameter being orthogonal to the chord;
 moving the probe along the diameter until the probe contacts one lip of the cavity;
 returning the probe along the diameter until the probe locates the opposite lip of the cavity;
 returning the probe to the midpoint of the diameter which is the point where the drillhole centerline axis intersects the plane of the drillhole centerline determining interposer.

21. The method of teaching a probe-trainable drill robot coordinates corresponding to a part, according to claim 20, comprising multiple iterations of probing actions to increase accuracy.

22. The method of teaching a probe-trainable drill robot coordinates corresponding to a part, according to claim 21, in which the probe is a drill bit.

23. The method of teaching a probe-trainable drill robot coordinates corresponding to a part, according to claim 20, in which the probe is a drill bit.

24. The method of calibrating a probe-trainable robot with respect to a part, comprising the following steps:
 positioning in the work envelope of the robot a part with a plurality of centerline determining interposers, affixed by mounting means, each having a planarization platform with a planarization surface and a central physical feature coaxial to an axis orthogonal to the planarization surface, the interposers having been positioned in known relationship to the part;
 examining by multiple probing the planarization platforms and the central physical features of said interposers to determine information related to coordinates of location and orientation and calculating coordinates for each of said interposers for said plurality interposers; and
 calculating the coordinates of the part from said coordinates of location and orientation of said interposers.

* * * * *